US010046464B2

(12) United States Patent
Davi et al.

(10) Patent No.: US 10,046,464 B2
(45) Date of Patent: Aug. 14, 2018

(54) DEVICE FOR PICKING ARTICLES

(71) Applicant: CT PACK S.R.L., Valsamoggia (Bologna) (IT)

(72) Inventors: Daniele Davi, Ferrara (IT); Michele Pallara, Ferrara (IT)

(73) Assignee: CT PACK S.R.L., Valsamoggia (Bologna) (IT)

(*) Notice: Subject to any disclaimer, the term of this patent is extended or adjusted under 35 U.S.C. 154(b) by 0 days.

(21) Appl. No.: 15/475,776

(22) Filed: Mar. 31, 2017

(65) Prior Publication Data

US 2017/0291307 A1  Oct. 12, 2017

(30) Foreign Application Priority Data

Apr. 8, 2016 (IT) .................. 102016000036614

(51) Int. Cl.
| | | |
|---|---|---|
| *B25J 15/06* | (2006.01) | |
| *B65G 47/91* | (2006.01) | |
| *B25J 15/00* | (2006.01) | |

(52) U.S. Cl.
CPC ....... *B25J 15/0052* (2013.01); *B25J 15/0616* (2013.01); *B65G 47/914* (2013.01); *B65G 47/918* (2013.01)

(58) Field of Classification Search
CPC  B25J 11/0045; B25J 15/0052; B25J 15/0057; B25J 15/0616; B65G 47/26; B65G 47/907; B65G 47/912; B65G 47/914; B65G 47/918; B65B 21/20; B65B 35/38
USPC ........... 294/65, 87.1; 414/416.02; 198/468.3, 198/468.4
See application file for complete search history.

(56) References Cited

U.S. PATENT DOCUMENTS

| | | | | |
|---|---|---|---|---|
| 4,444,424 A | | 4/1984 | Lebret | |
| 4,685,714 A | * | 8/1987 | Hoke | ................... B66C 1/0212 294/65 |
| 5,161,847 A | * | 11/1992 | Yakou | ................... B25J 15/103 294/119.1 |

(Continued)

FOREIGN PATENT DOCUMENTS

| | | |
|---|---|---|
| EP | 1048595 A1 | 11/2000 |
| EP | 2108604 A1 | 10/2009 |

(Continued)

OTHER PUBLICATIONS

Italian Search Report dated Dec. 20, 2016 for counterpart Italian Application No. UA20162445.

*Primary Examiner* — Dean J Kramer
(74) *Attorney, Agent, or Firm* — Timothy J. Klima; Shuttleworth & Ingersoll, PLC

(57) ABSTRACT

A device for picking articles includes a supporting unit and a plurality of gripper heads equipped with respective mechanisms for gripping an article and movable relative to the supporting unit along a picking direction. The gripper heads are divided into at least first gripper heads and second gripper heads. The device includes at least a first picking unit, applied to the supporting unit and on which the first gripper heads are positioned in mutually aligned configuration along a first alignment direction, and a second picking unit, applied to the supporting unit and on which the second gripper heads are positioned in mutually aligned configuration along a second alignment direction transversal to the first alignment direction.

9 Claims, 3 Drawing Sheets

(56) References Cited

U.S. PATENT DOCUMENTS

| | | | | |
|---|---|---|---|---|
| 5,553,442 A * | 9/1996 | Fadaie | ................ | B65B 25/146 |
| | | | | 414/404 |
| 5,564,893 A * | 10/1996 | Tacchi | ................ | B65G 47/902 |
| | | | | 414/796.9 |
| 5,630,311 A * | 5/1997 | Flix | ................ | B65B 21/06 |
| | | | | 198/419.3 |
| 5,931,279 A * | 8/1999 | Pedrotto | ................ | B65G 47/918 |
| | | | | 198/468.3 |
| 6,439,631 B1 * | 8/2002 | Kress | ................ | B65G 47/918 |
| | | | | 294/65 |
| 7,029,046 B2 * | 4/2006 | Lim | ................ | B23Q 5/40 |
| | | | | 294/188 |
| 7,090,559 B2 * | 8/2006 | Vulich | ................ | B24B 9/14 |
| | | | | 451/10 |
| 8,876,182 B2 * | 11/2014 | Eidelberg | ................ | B66C 1/00 |
| | | | | 198/468.3 |
| 2001/0038295 A1 | 11/2001 | Kim et al. | | |
| 2009/0084660 A1 * | 4/2009 | Kita | ................ | B25J 15/0052 |
| | | | | 198/803.3 |
| 2009/0206216 A1 * | 8/2009 | Katsutani | ................ | B25J 15/0052 |
| | | | | 248/205.8 |
| 2010/0140969 A1 * | 6/2010 | Lin | ................ | B25J 15/0052 |
| | | | | 294/86.4 |
| 2012/0039699 A1 | 2/2012 | Ward et al. | | |

FOREIGN PATENT DOCUMENTS

| | | |
|---|---|---|
| GB | 2092090 A | 8/1982 |
| NL | 8503510 A | 7/1987 |

* cited by examiner

DEVICE FOR PICKING ARTICLES

This application claims priority to Italian Patent Application 102016000036614 filed Apr. 8, 2016, the entirety of which is incorporated by reference herein.

BACKGROUND OF THE INVENTION

This invention relates to a device for picking articles.

The invention relates to a device for picking one or more articles, in particular a picking device which can be used for picking food items in packaging systems.

SUMMARY OF THE INVENTION

These devices are usually provided with gripper heads having suction cups which pick up one or more articles to then arrange them inside a container for their packaging.

For example, the articles to be packaged are positioned according to a predetermined alignment direction and with constant spacing on conveyor belts, in such a way that the known picking devices, equipped with gripper heads parallel to each other, can pick up the articles at their alignment directions.

However, the articles may often vary in a packaging system in terms of type, size and picking positioning; the prior art devices must therefore be adapted or even changed in order to correctly pick up the articles to be packed.

If, for example, a customer needed to:
- simultaneously pick up six articles arranged on a conveyor belt according to three parallel rows and three rows perpendicular to the first three in order to compact them and place them in a container located on another conveyor belt, or
- pick up simultaneously six articles arranged on a conveyor belt according to parallel rows in order to compact them and place them in a container positioned on another conveyor belt in such a way that three are positioned parallel and three are positioned perpendicularly to the first three, this would not be possible with the prior art devices, except with time-consuming and laborious modifications to the system.

If then the arrangement of the articles on the conveyor belt or in the box/container is subject to variations within a single production cycle, the plant would be unmanageable with the prior art devices.

So as to satisfy a series of various commercial packaging requirements, or more simply in order to optimize the spaces inside the packs or to make the articles more stable during their transport in order to prevent possible damage, the Applicant has noted the need to be provide a device which is also able to pick up articles which are positioned in alignment directions which are not parallel and/or to provide a device which is able to position the articles picked up inside a box according to directions of alignment which are not parallel.

In this context, the technical purpose which forms the basis of this invention is to propose a picking device which overcomes one or more of the above-mentioned drawbacks of the prior art.

The aim of this invention is therefore to meet the above-mentioned requirements, in particular by providing a device for picking articles which is structurally simple, easy to use and particularly flexible with respect to the requirements of the customer for boxing and packaging.

A further aim of this invention is to provide a device for picking articles which is able to manage the picking of articles of any size irrespective of the feeding method with which they are conveyed towards the packaging station and their arrangement.

Another aim of this invention is to provide a picking device which is able to modify the spacing of the articles picked up. Yet another aim is to provide a device for picking articles which allows the production efficiency of the packaging/boxing process to be improved, being versatile and fast in any positioning of the articles inside the packs and in any position of the article during pick up.

The technical purpose indicated and the aims specified are substantially achieved by a picking device, comprising the technical features described in one or more of the appended claims.

More specifically, this invention comprises a picking device comprising a supporting unit and a plurality of gripping heads carried by the supporting unit, each gripper head being equipped with relative means for gripping an article and being movable relative to the supporting unit along a picking direction.

The gripper heads are divided into at least first gripper heads and second gripper heads.

The device comprises at least a first picking unit, applied to the supporting unit and on which the first gripper heads are positioned in mutually aligned configuration along a first alignment direction, and a second picking unit, applied to the supporting unit and on which the second gripper heads are positioned in mutually aligned configuration along a second alignment direction transversal to the first alignment direction.

The dependent claims, which are incorporated here by reference, correspond to different embodiments of the invention.

BRIEF DESCRIPTION OF THE DRAWINGS

Further features and advantages of the invention are more apparent in the non-limiting description which follows of a preferred embodiment of a picking device as illustrated in the accompanying drawings, in which.

DESCRIPTION OF THE PREFERRED EMBODIMENTS

Figure 1:
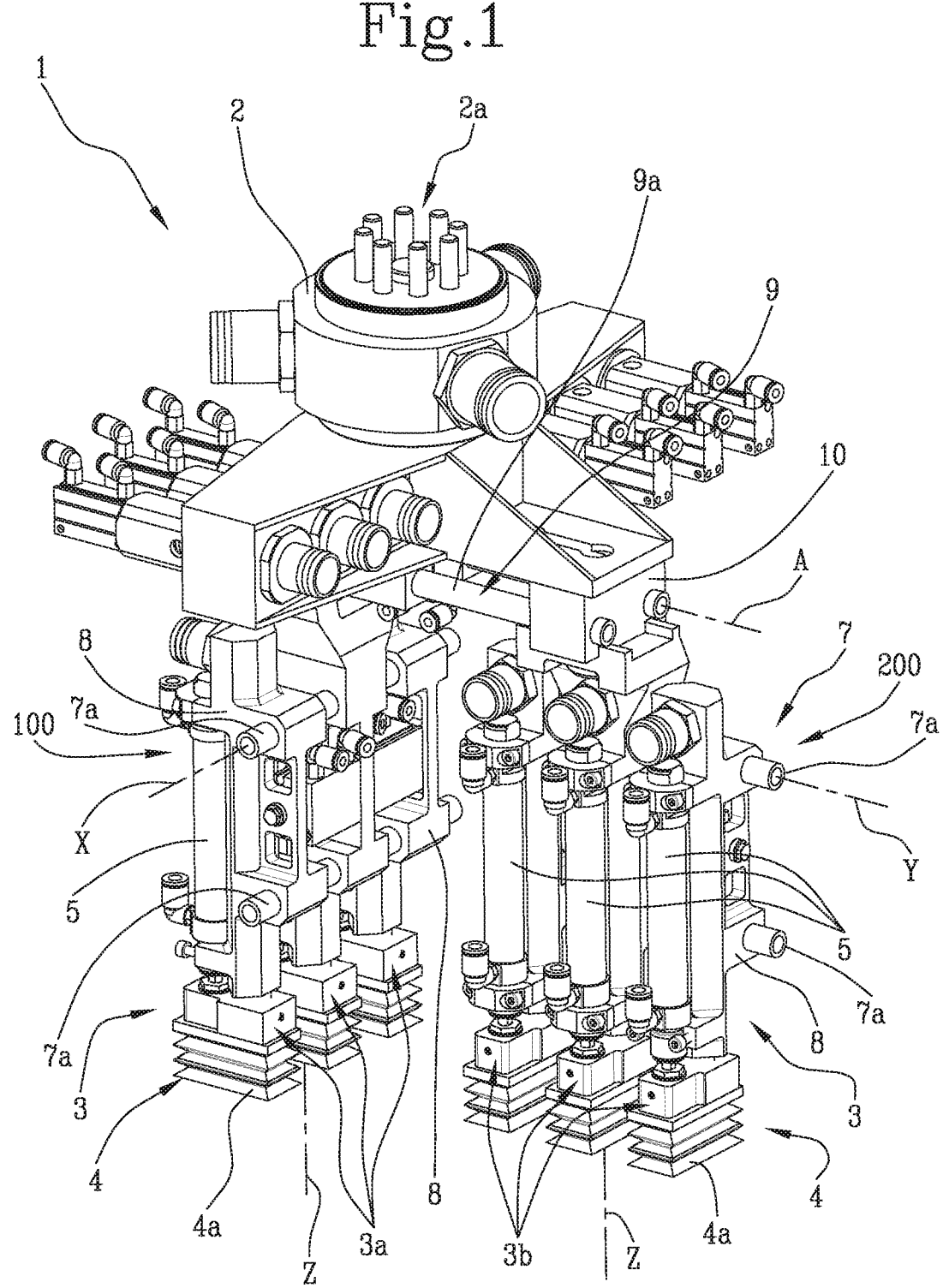
FIG. 1 is a schematic perspective view of a device for picking articles according to a possible embodiment of this invention.

With reference to the accompanying drawings, the numeral 1 denotes a device for picking articles according to this invention, hereinafter referred to simply as the device 1.

The device 1 according to the invention may be used in any system for packaging/boxing articles, but also in other types of systems/plants.

More specifically, it should be noted that the device 1 for picking articles comprises a supporting unit 2.

The expression "supporting unit" means one or more elements having designed to support the gripper heads, which are described in more detail below.

Preferably, the supporting unit 2 comprises a connecting portion 2a designed to engage with a handling device or a robot, not illustrated, for moving the device 1.

The device 1 comprises a plurality of gripper heads 3 carried by the supporting unit 2, each gripper head 3 being equipped with relative means 4 for gripping an article, not illustrated.

The gripping means 4 are means for holding an article by negative pressure.

Preferably, the means 4 for gripping the article are of known type and preferably comprise one or more suction cups 4a connected with a suction device for generating a vacuum, not illustrated.

The negative pressure generated allows the suction cup 4a to support the article in suspension.

Each gripper head 3 is movable relative to the supporting unit 2 along a picking direction Z for picking up an article.

Preferably, each gripper head 3 is movable independently of the others along the pickup direction Z.

Preferably, the movement of each gripper head 3 is achieved by a linear actuator 5 active along the respective picking direction Z.

Figure 3:
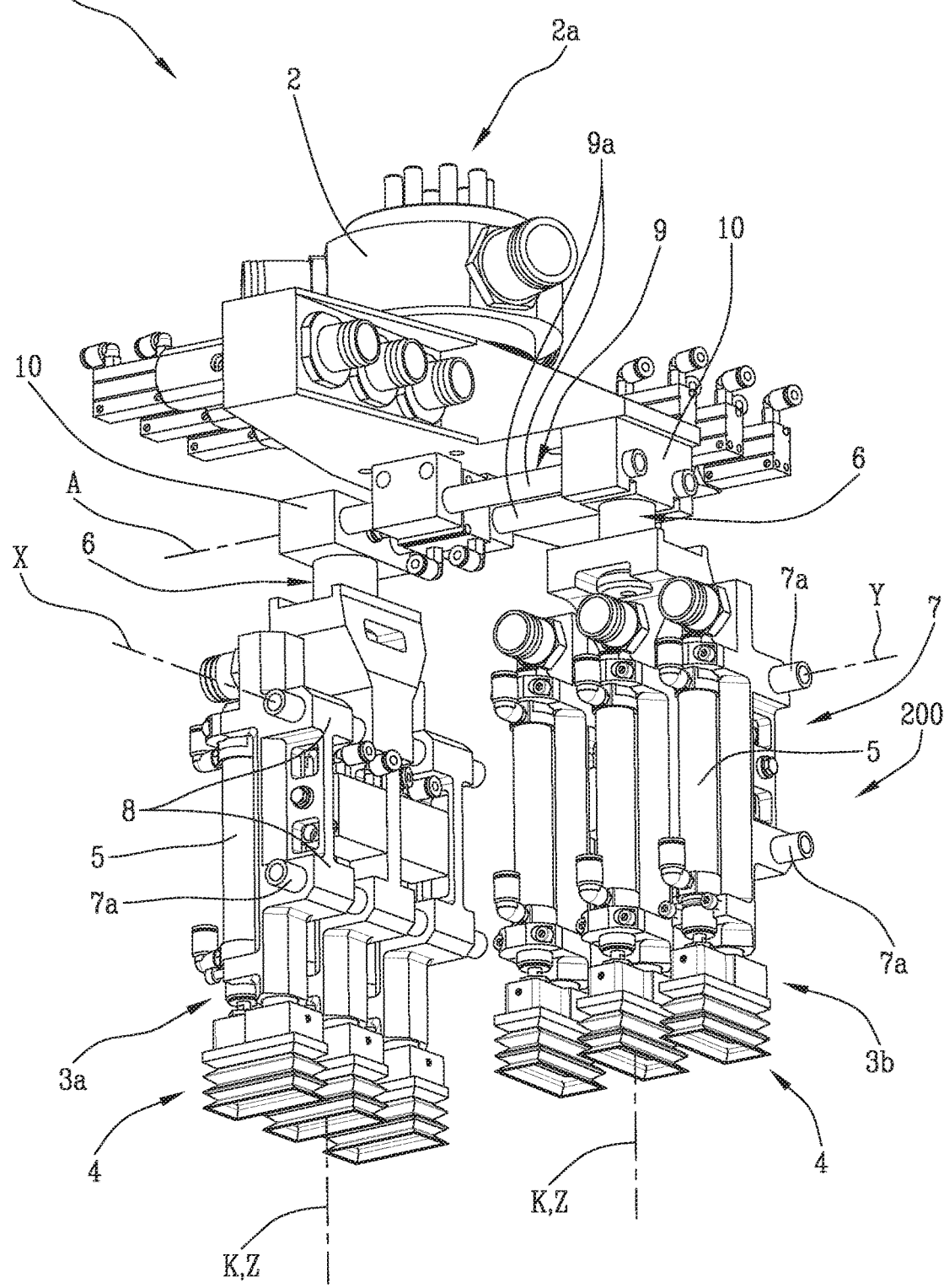
FIG. 3 is a schematic perspective view of a device for picking articles of FIG. 1 according to a further possible embodiment of this invention.

According to this invention, as illustrated in FIGS. 1 and 3, the gripper heads 3 are divided into at least first gripper heads 3a and second gripper heads 3b.

More specifically, the device 1 comprises at least a first picking unit 100, applied to the supporting unit 2 and on which the first gripper heads 3a are positioned in mutually aligned configuration along a first alignment direction X, and a second picking unit 200, applied to the supporting unit 4 and on which the second gripper heads 3b are positioned in mutually aligned configuration along a second alignment direction Y transversal to the first alignment direction X.

In other words, the gripper heads 3a, 3b belonging to the same picking unit 100, 200 are positioned side by side in series along the respective alignment direction X, Y. The alignment direction X, Y defines the direction along which the gripper heads 3 compact (or even move apart) the articles before these are packaged/boxed.

With reference to the embodiments illustrated in FIGS. 1 and 3 the first picking unit 100 comprises three first gripper heads 3a and the second picking unit comprises three second gripper heads 3b.

Advantageously, the second alignment direction Y is positioned angularly (transversal, that is to say, at 90°) to the first alignment direction X.

In this way, the device 1 is able to pick up, and then compact, articles positioned transversely aligned with each other.

In effect, the first picking unit 100 picks up the articles aligned parallel to the alignment direction X, whilst the pickup unit 200 pick up the articles aligned parallel to the direction Y.

With reference to the embodiments illustrated in FIGS. 1 and 3, preferably the first and second alignment direction X, Y of the gripper heads 3a, 3b are perpendicular to each other.

With reference to the embodiment of FIG. 1, preferably the first picking unit 100 and the second picking unit 200 are positioned according to a fixed orientation, so that the angle between the first alignment direction X and the second alignment direction Y is equal to a predetermined value.

On the other hand, with reference to the embodiment of FIG. 3, preferably at least one of the picking units 100, 200 is rotatably connected to the supporting unit 2.

Preferably, the device comprises rotation means 6 for rotating the picking unit 100, 200 around an axis of rotation K parallel to the picking direction Z so that the first alignment direction X and the second alignment direction Y are transversal to each other at least in one working configuration.

Thanks to the presence of the rotation means 6, the device 1 is advantageously able to pick up, and then compact, articles aligned or not aligned with each other for being packaged/boxed transversally.

In effect, by rotating the picking unit 100, 200 about the axis of rotation K it is possible to vary the orientation of the alignment direction X, Y of the gripper heads 3a, 3b to allow the correct picking up of the articles and/or to allow packaging/boxing them according to any need of spatial orientation about the axis of rotation.

According to this invention, it is therefore possible, for example, to pick up a certain number of aligned articles and then package/box a part of them along an alignment direction of X, Y and a part of them according to another alignment.

Similarly, it is possible to pick up a certain number of articles not aligned and then package/box them all aligned according to an alignment direction X, Y equal for them all.

Advantageously, simply by applying one or more rotations of the picking unit 100, 200 it is possible to obtain a high degree of flexibility of packaging/boxing which allows an effective use of the device 1 without the need to interrupt the production cycle.

As illustrated in FIG. 3, the axis of rotation preferably lies inside a plane in which the picking directions Z of the gripper heads 3a, 3b of at least one picking unit 100, 200 lie.

More specifically, in the embodiment illustrated in FIG. 3, both the picking units 100, 200 can be rotated about a respective axis of rotation K coinciding with the picking direction Z of the respective central gripper head 3a, 3b.

In a possible embodiment of this invention, not illustrated in the accompanying drawings, the axis of rotation K could lie in an eccentric position relative to the plane in which the picking directions Z of the gripper heads 3a, 3b of the picking unit 100, 200 lie. For example, the axis of rotation K could pass through a fulcrum, not illustrated in the drawings, of the supporting unit 2 about which at least one picking unit rotates.

Advantageously, the rotation means 6 are configured to position the two picking units 100, 200 at any reciprocal angles included between 0° and 360°.

Preferably, at least one of the picking units 100, 200 comprises movement means 7 configured to move one or more of the gripper heads 3a, 3b of the picking unit 100, 200 along the respective alignment direction X, Y to achieve a compacting or moving away of the gripper heads 3a, 3b towards/from each other.

With reference to the accompanying drawings, the movement means 7 preferably comprise slides 7a on which are slidably mounted the gripper heads 3a, 3b of at least one picking unit 100, 200. Preferably, each gripper head 3a, 3b comprises a connecting portion 8 designed to be moved by an actuator, not illustrated in the accompanying drawings, to slide on the slides 7a.

Still more preferably, in the embodiments illustrated in the accompanying drawings, the slides 7a are cylinders and the connecting portions are sleeves inside of which the cylinders slide.

However, according to other possible embodiments, not illustrated in the accompanying drawings, there might be a pantograph system or an electromagnetic system or a linear motor.

Preferably, each gripper head 3a, 3b is movable independently from the others along the respective alignment direction X, Y.

Preferably, the supporting unit 2 according to this invention comprises approaching/distancing means 9 configured to mutually move at least one picking unit 100 towards and/or away from the other picking unit 200, preferably using linear movement.

Advantageously, according to this invention, the device 1 can make a three-dimensional type movement of the gripper heads 3a, 3b in the space.

More specifically, in the embodiment illustrated in FIG. 1, the gripper heads 3a, 3b as well as being able to move along the picking directions Z and the respective alignment directions X, Y, can also move along an approaching/distancing direction A perpendicular to both the picking direction Z and the alignment direction Y, offering a high degree of freedom in the positioning of the first heads 3a.

In the embodiment of FIG. 3, on the other hand, the possibility of moving the gripper heads 3a, 3b along a direction towards/away A in synergy with the possibility of rotating the picking unit 100, 200 about the axis of rotation K allows maximum flexibility in positioning both of the first gripper heads 3a and of the second gripper heads 3b.

Preferably, the approaching/distancing means 9 comprise at least one linear guide 9a on which at least one of the picking units 100, 200 is slidably mounted.

Preferably, the picking unit 100, 200 then comprises a hooking portion 10 which can be moved by an actuator, not illustrated, to translate the picking unit 100, 200 on the linear guide 9a.

Still more preferably in the embodiments illustrated in the accompanying drawings, the linear guides 9a are cylinders and the hooking portions 10 are sleeves.

However, according to other possible embodiments, not illustrated in the accompanying drawings, there might be a pantograph system or an electromagnetic system or a linear motor.

Figure 2:
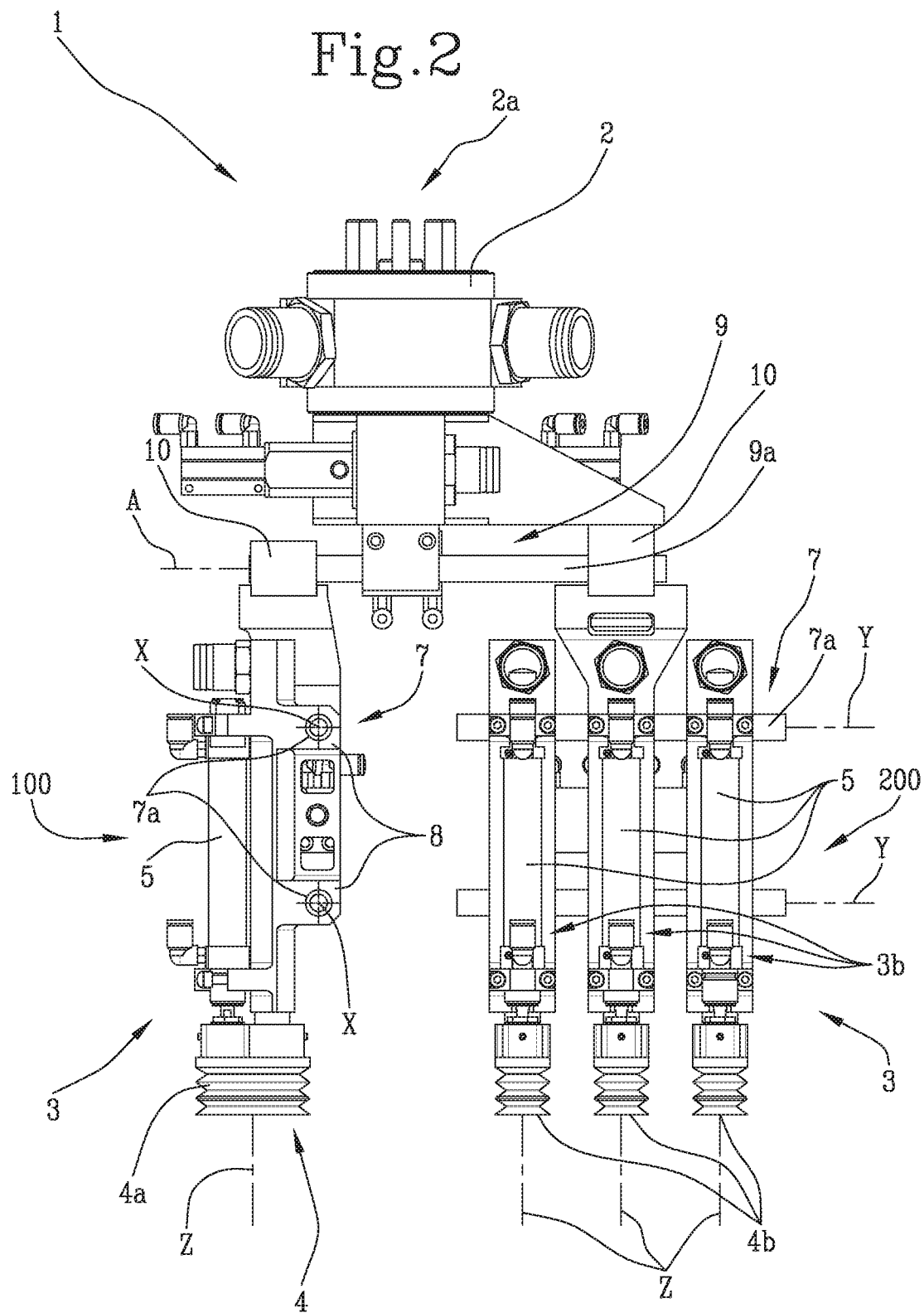
FIG. 2 is a schematic side view of the device of FIG. 1.

Preferably, the first alignment direction X and the second alignment direction of the gripper heads 3a, 3b are perpendicular to each other. More specifically, in the first embodiment illustrated in FIGS. 1 and 2 the two alignment directions X, Y are perpendicular and fixed, whilst in the second embodiment illustrated in FIG. 3 a particular operating configuration is shown wherein they are perpendicular, but could rotate relative to each other to a further configuration not illustrated.

Preferably, each gripper head 3a, 3b of at least one picking unit 100, 200 is rotatable about its picking direction Z.

It should be noted that the heads of each group can also be connected by means of a pantograph device: in this case, the device comprises a first pantograph, associated with the first gripper heads, and a second pantograph, associated with the second gripper heads.

Advantageously, in this way it is possible to satisfy the most diverse requirements of positioning and/or adjusting the orientation of one or more gripper heads 3a, 3b for picking up articles located incorrectly or misaligned with each other.

The invention achieves the present aims, overcoming the drawbacks of the prior art and providing the user with a device for picking articles which is flexible and versatile, designed to meet any positioning requirements.

What is claimed is:

1. A device for picking articles, comprising:
   a supporting unit;
   a plurality of gripper heads carried by the supporting unit, each gripper head including a gripper for gripping an article and being movable relative to the supporting unit along a picking direction;
   wherein the gripper heads are divided into first gripper heads and second gripper heads,
   a first picking unit, applied to the supporting unit and on which the first gripper heads are positioned in mutually aligned configuration along a first alignment direction, and
   a second picking unit, applied to the supporting unit and on which the second gripper heads are positioned in mutually aligned configuration along a second alignment direction positioned angularly to the first alignment direction;
   wherein the first and second alignment directions are transverse to each other;
   wherein the supporting unit comprises a first movement mechanism configured to move at least one of the first and second picking units towards and away from the other of the first and second picking units using linear movement, the first movement mechanism including a linear guide on which both the first and second picking units are slidably mounted;
   wherein at least one of the first and second picking units comprises a second movement mechanism configured to move at least one of the respective gripper heads along the respective alignment direction to achieve a compacting of the respective gripper heads toward each other or a spreading out of the respective gripper heads away from each other;
   wherein the first movement mechanism includes an electromagnetic system for moving the at least one of the first and second picking units.

2. The device for picking articles according to claim 1, wherein the at least one of the first and second picking units is rotatably connected to the supporting unit, and further comprising a rotation mechanism for rotating the at least one of the first and second picking units around an axis of rotation parallel to the picking direction.

3. The device for picking articles according to claim 2, wherein the axis of rotation lies inside a plane in which the picking directions of the gripper heads of the at least one of the first and second picking units lies.

4. The device for picking articles according to claim 2, wherein the rotation mechanism is configured to position the first and second picking units at any reciprocal angles included between 0° and 360°.

5. The device for picking articles according to claim 1, wherein the second movement mechanism comprises slides on which the gripper heads of the at least one of the first and second picking units are slidably mounted, each gripper head comprising respectively, a connecting portion movable by an actuator to slide on the slides.

6. The device for picking articles according to claim 1, wherein at least one chosen from the first and second picking units includes a hooking portion which is movable by an actuator to translate the at least one chosen from the first and second picking units on the linear guide.

7. The device for picking articles according to claim 1, wherein the first and second alignment directions are perpendicular to each other.

8. The device for picking articles according to claim 1, wherein each gripper head of the at least one of the first and second picking units is rotatable around the picking direction.

9. The device for picking articles according to claim 1, wherein each gripper head is movable independently from the other gripper heads along at least one chosen from the picking direction and the respective alignment direction.

* * * * *